(12) United States Patent
Wu (10) Patent No.: US 10,200,665 B2
(45) Date of Patent: Feb. 5, 2019

(54) DISPLAY PANEL AND DISPLAY DEVICE

(71) Applicant: BOE TECHNOLOGY GROUP CO., LTD., Beijing (CN)

(72) Inventor: Yanbing Wu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 183 days.

(21) Appl. No.: 15/123,049

(22) PCT Filed: Jan. 5, 2016

(86) PCT No.: PCT/CN2016/070091
§ 371 (c)(1),
(2) Date: Sep. 1, 2016

(87) PCT Pub. No.: WO2017/016188
PCT Pub. Date: Feb. 2, 2017

(65) Prior Publication Data
US 2017/0163959 A1    Jun. 8, 2017

(30) Foreign Application Priority Data

Jul. 28, 2015 (CN) .......................... 2015 1 0451018

(51) Int. Cl.
*G02F 1/1333* (2006.01)
*H04N 13/122* (2018.01)
*G09G 3/00* (2006.01)
*H04N 5/64* (2006.01)

(52) U.S. Cl.
CPC ......... *H04N 13/122* (2018.05); *G02F 1/1333* (2013.01); *G09G 3/003* (2013.01); *H04N 5/64* (2013.01)

(58) Field of Classification Search
CPC ................... G02F 1/133305; H04N 13/0018
See application file for complete search history.

(56) References Cited

U.S. PATENT DOCUMENTS

| | | | | |
|---|---|---|---|---|
| 2015/0146385 A1* | 5/2015 | Kim | .................. | G02F 1/133308 361/749 |
| 2015/0277854 A1* | 10/2015 | Zhang | .................. | G06F 1/1652 345/156 |
| 2016/0014403 A1* | 1/2016 | Stroetmann | ........... | G06F 1/1641 348/53 |

(Continued)

FOREIGN PATENT DOCUMENTS

| CN | 101344651 A | 1/2009 |
|---|---|---|
| CN | 102077263 A | 5/2011 |

(Continued)

OTHER PUBLICATIONS

1st office action issued in corresponding Chinese application No. 201510451018.8 dated Sep. 7, 2016.

(Continued)

*Primary Examiner* — Edmond Lau
(74) *Attorney, Agent, or Firm* — Nath, Goldberg & Meyer; Joshua B. Goldberg; Daniel Bissing (57) ABSTRACT

The present invention involves a display panel and a display device. The display panel includes a display surface for displaying images, and the display surface is concave when being viewed in front of the display surface. The display panel can provide a good sense of presence when displaying images.

16 Claims, 6 Drawing Sheets

(56) References Cited

U.S. PATENT DOCUMENTS

2016/0212331 A1* 7/2016 Kimura ................ H04N 5/2628

FOREIGN PATENT DOCUMENTS

| | | |
|---|---|---|
| CN | 103559835 A | 2/2014 |
| CN | 104347009 A | 2/2015 |
| CN | 104380715 A | 2/2015 |
| CN | 104464520 A | 3/2015 |
| CN | 104570368 A | 4/2015 |
| CN | 105100782 A | 11/2015 |
| JP | 2000-275755 A | 10/2000 |
| JP | 2002-6797 A | 1/2002 |

OTHER PUBLICATIONS

Form PCT/ISA/210 issued in corresponding international application No. PCT/CN2016/070091 dated May 5, 2016.
Form PCT/ISA/220 issued in corresponding international application No. PCT/CN2016/070091 dated May 5, 2016.
Form PCT/ISA/237 issued in corresponding international application No. PCT/CN2016/070091 dated May 5, 2016.

* cited by examiner

DISPLAY PANEL AND DISPLAY DEVICE

This is a National Phase Application filed under 35 U.S.C. 371 as a national stage of PCT/CN2016/070091, filed Jan. 5, 2016, an application claiming the benefit of Chinese Application No. 201510451018.8, filed Jul. 28, 2015, the content of each of which is hereby incorporated by reference in its entirety.

FIELD

The present invention relates to the field of display technology, and particularly, to a display panel and a display device.

BACKGROUND

A display device usually has a flat display surface. When displaying an image containing a stereoscopic scene, the display device brings a poor sense of presence.

With the development of display technology, 3D display device emerges. When displaying an image, the display device provides a stereoscopic sense and brings a better sense of presence to a viewer by a way that the left eye and the right eye of the viewer receive a left-eye image and a right-eye image respectively, and then the left-eye image and the right-eye image are synthesized as a 3D image.

However, the aforesaid existing 3D display device needs to display a left-eye image and a right-eye image simultaneously, and thus requires more complicated technology and higher cost.

SUMMARY

In order to address at least one of the technical problems existing in the prior art, the present invention provides a display panel and a display device including the display panel, which can provide a better sense of presence when displaying an image.

In order to achieve an object of the present invention, there is provided a display panel having a display surface for displaying images and the display surface is concave when being viewed in front of the display surface.

The display surface may be longitudinally concave.

Preferably, the display surface may be bent longitudinally into a circular arc surface, wherein, an axis angle corresponding to the circular arc surface may be greater than or equal to 15 degrees and less than or equal to 100 degrees, for example, the axis angle may be 45 degrees. Moreover, the axis angle corresponding to the circular arc surface may be less than or equal to 90 degrees to prevent the viewing effect from being effected due to the upwardly bent display surface.

As an alternative, the display surface may include a first display region and a second display region which are connected longitudinally, wherein, the first display region is located below the second display region.

The first display region and the second display region may both be a flat display region, during normal use, the second display region is placed vertically, a certain intersection angle is formed between the first display region and the second display region, and the intersection angle between the first display region and the second display region is greater than or equal to 90 degrees and less than or equal to 165 degrees.

The intersection angle between the first display region and the second display region may be 125 degrees.

As an alternative, the first display region may be bent longitudinally into a circular arc surface.

Preferably, an axis angle corresponding to the circular arc surface of the first display region is less than or equal to 90 degrees.

Further preferably, the second display region may also be bent longitudinally into a circular arc surface, wherein, a curvature of the first display region is preferably not less than a curvature of the second display region.

As another alternative, the first display region may include a plurality of flat display sub-regions which are connected longitudinally, and certain intersection angles are formed by the flat display sub-regions.

Preferably, the intersection angles between adjacent flat display sub-regions increase successively from top to bottom.

The display surface may also be laterally concave.

An area of the first display region may be not less than an area of the second display region.

The display panel may further include an image identification module, which identifies a base portion and a vertical portion of an image to be displayed by the display panel;

the first display region displays a base portion image identified by the image identification module; and the second display region displays a vertical portion image identified by the image identification module.

The display panel may further include an image processing module, which cuts the base portion image into an inverted isosceles trapezoid and stretches the inverted isosceles trapezoid into a rectangle; and the first display region displays a rectangular image obtained after being processed by the image processing module.

The present invention further provides a display device, including the display panel.

Beneficial effects of the present invention are as follows:

In the display panel provided by the present invention, the display surface thereof is concave when being viewed in front of the display surface, so that when displaying an image, a distance between displayed contents of the vertical portion of the image and a viewer and a distance between displayed contents of the base portion of the image and a viewer are different, and the distances between different positions on the base portion and the viewer are also different, which can therefore improve the sense of presence for the viewer. Moreover, when displaying scenes such as corridor, tunnel and the like, the distances between different positions on a left vertical portion image and a right vertical portion image of the scene and the viewer are also different, thereby providing a better sense of presence to the viewer.

The display device provided by the present invention adopts the display panel provided by the present invention and can provide a better sense of presence when displaying images.

BRIEF DESCRIPTION OF THE DRAWINGS

The accompanying drawings are used to provide a further understanding of the invention, constitute a part of the specification, are used to interpret the invention in conjunction with the following embodiments, and do not limit the invention. In the drawings.

DESCRIPTION OF REFERENCE NUMERALS

D: ground; L: building; S: display surface; 1: first display region; 2: second display region; 10: flat display sub-region; and Z: section.

DETAILED DESCRIPTION OF THE EMBODIMENTS

Embodiments of the invention will be described in detail below in conjunction with the accompanying drawings. It should be understood that, the embodiments described herein are only used to illustrate and interpret the invention, and do not limit the invention.

The present invention provides a display panel having a display surface for displaying images, and the display surface is concave when being viewed in front of the display surface.

The display surface of the display panel provided by the present invention is concave when being viewed in front of the display surface, when displaying an image, a distance between displayed contents of a vertical portion of the image and a viewer and a distance between displayed contents of a base portion of the image and a viewer are different, and the contents are not displayed in a same plane, which can improve a sense of presence for the viewer.

Figure 1:
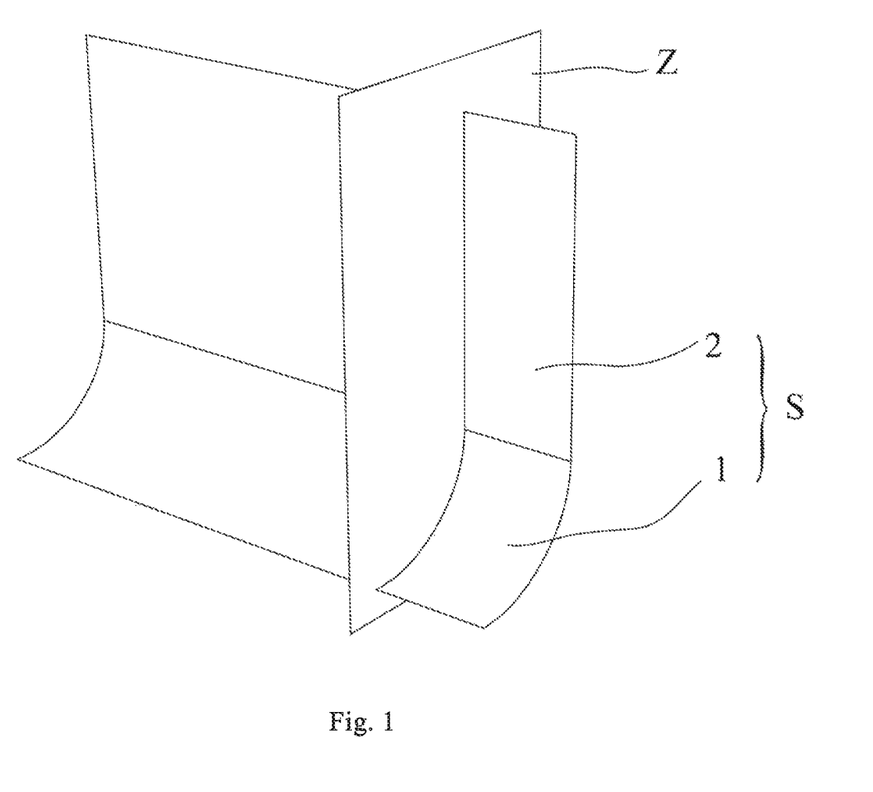
FIG. 1 is a schematic diagram of a display panel provided in a first embodiment of the present invention.
Figure 2:
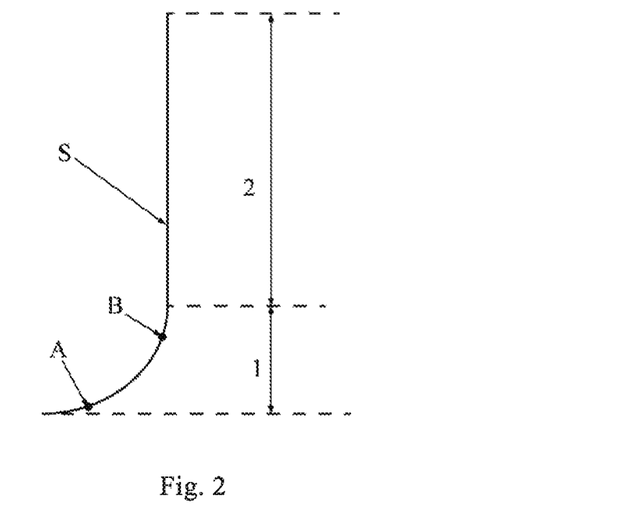
FIG. 2 is a sectional view of the display panel in FIG. 1 along a section Z.

FIG. 1 is a schematic diagram of a display panel provided in a first embodiment of the present invention; FIG. 2 is a sectional view of the display panel in FIG. 1 along a section Z. As shown in FIGS. 1 and 2, in the present embodiment, the display panel has a display surface S for displaying images, and in FIG. 2, the display surface S denotes a left side of the display panel. It can be known from FIGS. 1 and 2 that the display surface S of the display panel is not a plane but is longitudinally concave to a certain extent.

Specifically, the display surface S includes a first display region 1 and a second display region 2 which are connected longitudinally, and the first display region 1 is located below the second display region 2. As shown in FIG. 2, the first display region 1 shows a longitudinally bent arc, and the second display region 2 is a flat display region and is vertically placed during normal use.

Preferably, an axis angle corresponding to a circular arc surface of the first display region is less than or equal to 90 degrees, e.g., 30 degrees, because if the axis angle corresponding to the circular arc surface is greater than 90 degrees, the circular arc surface will bend upwardly, therefore influencing the viewing effect. Herein, the axis angle refers to a central angle corresponding to an arc where the circular arc surface intersects with a section Z.

Figure 3:
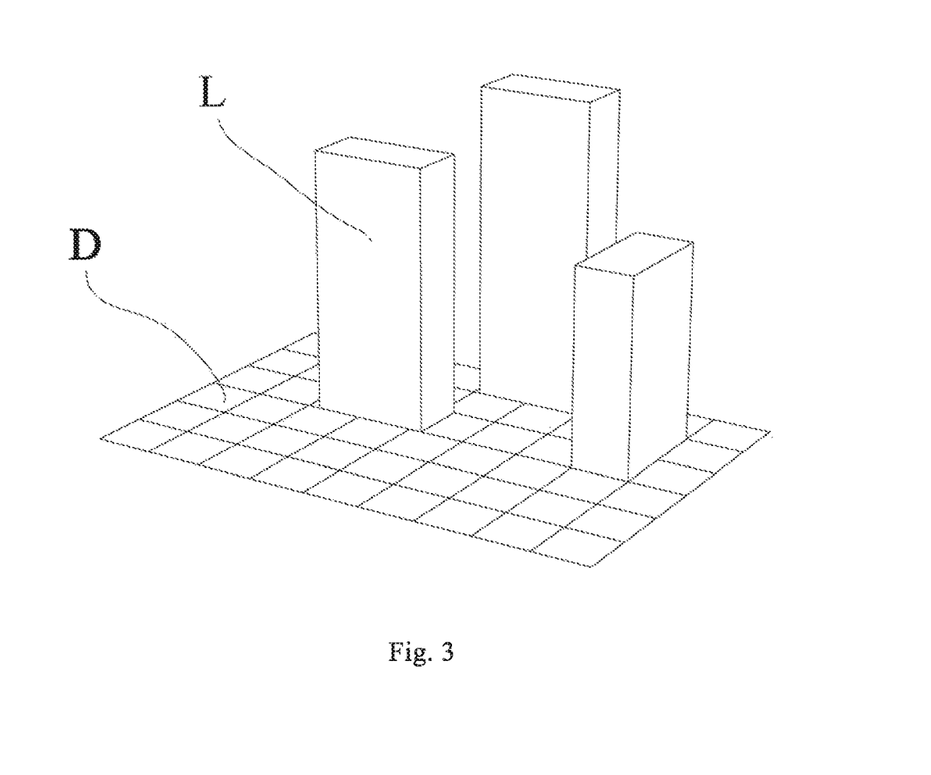
FIG. 3 is a schematic diagram of an image having a vertical portion and a base portion.

The inventor found that an image displayed by a display device generally involves a vertical portion and a base portion and there is usually a certain angle between objects displayed in the vertical portion and the base portion. For example, as shown in FIG. 3, "ground" D belongs to a base portion of an image, and "building" L or the like belongs to a vertical portion, it can be understood that there is a certain angle between the "building" L and the "ground" D, and the angle is 90 degrees in general. Whereas, a display surface of an existing display device is usually a plane, when the display device displays a three-dimensional image similar to the image as shown in FIG. 3, the "ground" D and the "building" L are displayed in a same plane, and an angle relationship between the "ground" D and the "building" L cannot be intuitively demonstrated. Meanwhile, during normal use, the display surface of the display device is usually in upright position, or approximately upright position, in such case, the "ground" D displayed by the display device fails to show the difference in distances between different regions of the "ground" D in a scene and a viewer, which is desired to be demonstrated by the image, and cannot bring a good sense of presence to the viewer.

In the present embodiment, the first display region 1 corresponds to a base portion of an image to be displayed and displays the base portion image, and the second display region 2 corresponds to a vertical portion of the image to be displayed and displays the vertical portion image.

As shown in FIGS. 1 and 2, in the present embodiment, the display surface S is longitudinally concave, a distance between a lower region of the first display region 1 and a viewer is less than a distance between an upper region of the first display region 1 and a viewer, so that when the first display region 1 displays the base portion image, an actual distance between a nearby region (see region A in FIG. 2) in the base portion image and the viewer is closer than an actual distance between a distant region (see region B in FIG. 2) in the base portion image and the viewer. Thus, in comparison with the prior art that a three-dimensional image is displayed in a single plane, the display panel in the present embodiment can bring a better and stronger sense of presence to the viewer when displaying the image including a base portion and a vertical portion. The display panel of the present invention has simpler principle, lower preparation cost and less technical difficulties compared with an existing 3D display device.

In general, an area of a vertical portion of an image to be displayed is greater than an area of a base portion thereof, therefore, in the present embodiment, an area of the first display region 1 is preferably not greater than an area of the second display region 2.

In the present embodiment, specifically, the display panel further includes an image identification module, which identifies a base portion and a vertical portion of an image to be displayed by the display panel. The first display region 1 displays a base portion image identified by the image identification module, and the second display region 2 displays a vertical portion image identified by the image identification module, therefore providing a better sense of presence to the viewer.

It should be understood that, a nearby visual field of the base portion image seen by the viewer should be smaller than a distant visual field of the base portion image seen by the viewer, for example, as shown in FIG. 2, a visual field of a region A in the base portion image seen by the viewer should be smaller than a visual field of a region B in the base portion image seen by the viewer.

Figure 4:
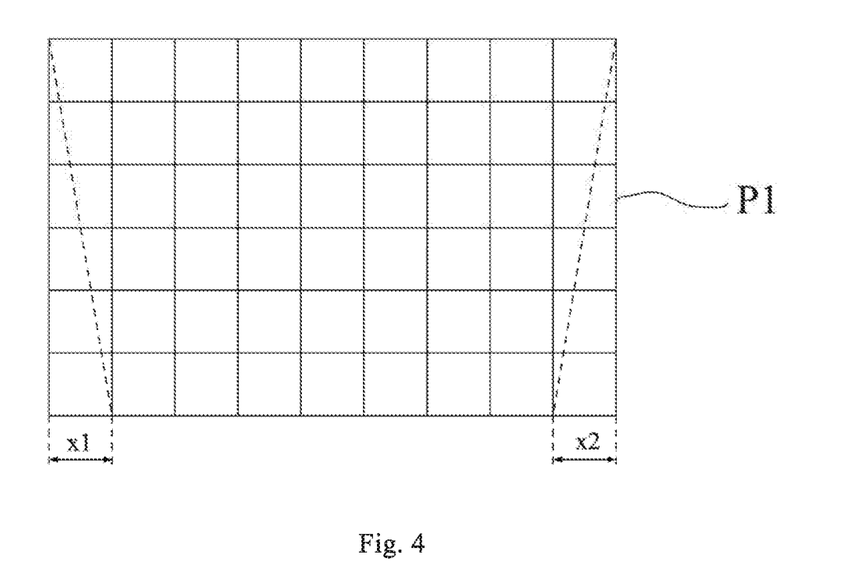
FIG. 4 is a schematic diagram of a base portion image identified by an image identification module.
Figure 5:
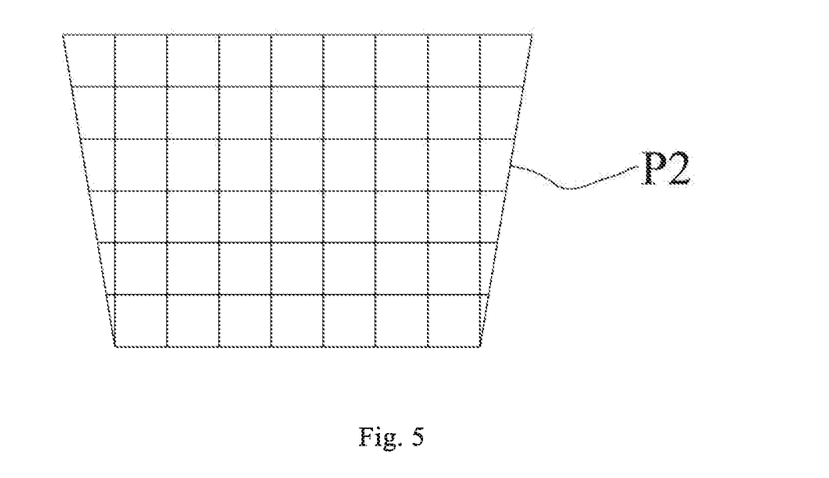
FIG. 5 is a schematic diagram of a base portion image having a shape of inverted isosceles trapezoid obtained after being processed by an image processing module.
Figure 6:
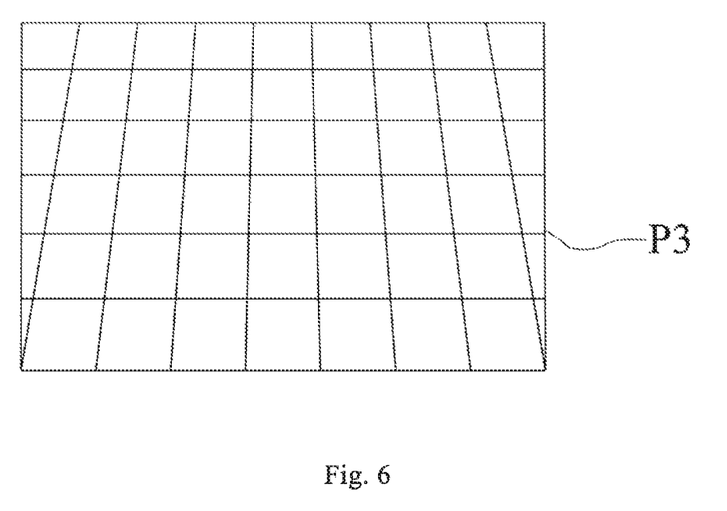
FIG. 6 is a schematic diagram of a base portion image displayed by a first display region.

Therefore, preferably, the display panel further includes an image processing module, which cuts the base portion image into an inverted isosceles trapezoid and stretches the inverted isosceles trapezoid into a rectangle, and the first display region displays a rectangular image obtained after being processed by the image processing module. Specifically, as shown in FIG. 4, P1 denotes a base portion image identified by the image processing module, the image processing module cuts the image P1 according to broken lines in FIG. 4 (wherein x1=x2) and can obtain an image P2 having a shape of inverted isosceles trapezoid as shown in FIG. 5; then lower edges of the image shown in FIG. 5 are stretched to both sides with stretched lengths being x1 and x2, and the inverted isosceles trapezoid in FIG. 5 can be converted into an image P3 having a shape of rectangle as shown in FIG. 6. During display, the first display region 1 displays a base portion image as shown in FIG. 6. It should be understood that, in the base portion image displayed in the first display region 1, a visual range thereof which is closer to the viewer is smaller than a visual range thereof which is distal to the viewer, thereby the base portion image displayed in the first display region 1 is more consistent with the real situation observed by the viewer on the scene that the base portion image is desired to be demonstrated. Thus, the display panel can provide a better sense of presence.

Figure 7:
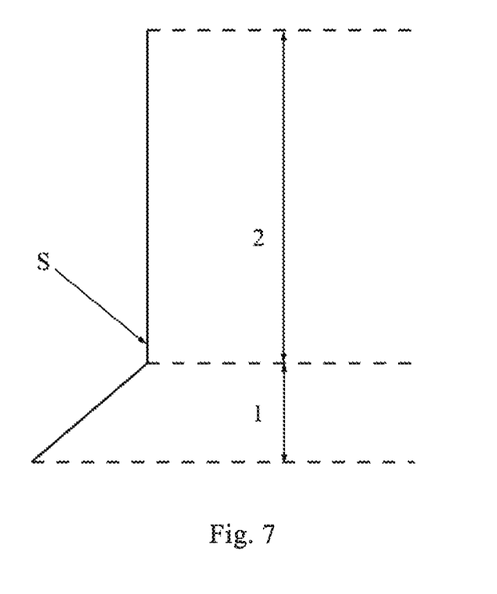
FIG. 7 is a schematic diagram of a display panel provided in a second embodiment of the present invention.

FIG. 7 is a schematic diagram of a display panel provided in a second embodiment of the present invention. As shown in FIG. 7, the present embodiment differs from the first embodiment in that: the first display region 1 is a flat display region.

In the present embodiment, the display surface S is also concave to a certain extent, and thus can improve a sense of presence when displaying images.

In the present embodiment, an intersection angle between the first display region 1 and the second display region 2 may be greater than or equal to 90 degrees and less than or equal to 165 degrees. Compared with the aforesaid embodiment, display surfaces of both the first display region 1 and the second display region 2 are plane and have simpler preparation process, lower preparation cost and less technical difficulties, which accordingly lowers the preparation cost and facilitates preparation of the display panel.

For example, the intersection angle between the first display region 1 and the second display region 2 may be 125 degrees, so that the intersection angle between the first display region 1 and the second display region 2 is closer to a real intersection angle between an object displayed in the base portion image and an object displayed in the vertical portion image, therefore providing a better sense of presence.

Figure 8:
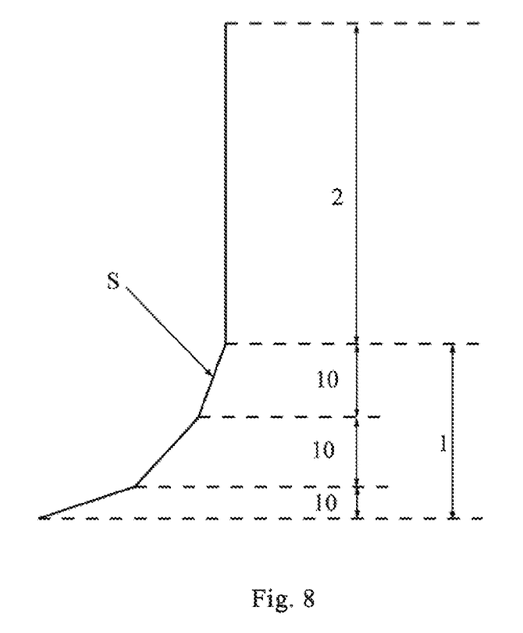
FIG. 8 is a schematic diagram of a first display region including a plurality of flat display sub-regions.

FIG. 7 shows a case that the first display region 1 is a flat display region. In addition, the first display region 1 in the present embodiment may also include a plurality of flat display sub-regions which are longitudinally connected. As shown in FIG. 8, the first display region 1 in the embodiment shown in FIG. 8 includes a plurality of flat display sub-regions 10 which are longitudinally connected, certain intersection angles are formed by the flat display sub-regions 10. Preferably, the intersection angles between two adjacent flat display sub-regions 10 increase successively from top to bottom.

Figure 9:
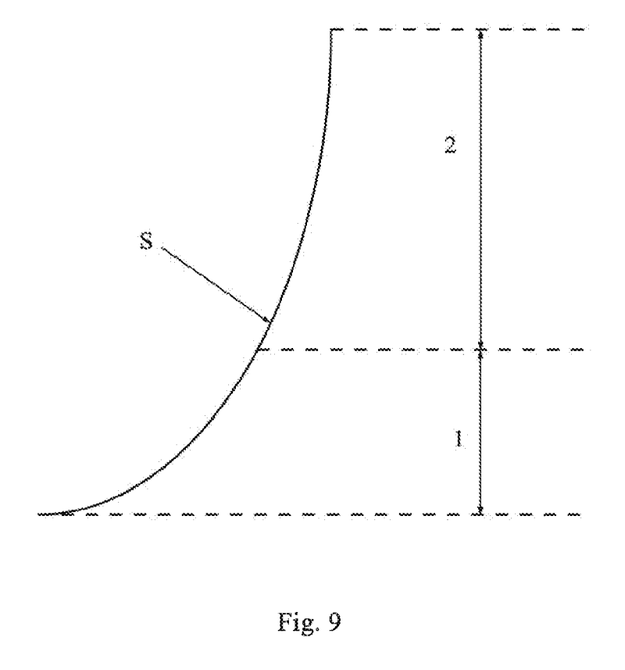
FIG. 9 is a schematic diagram of a display panel provided in a third embodiment of the present invention.

FIG. 9 is a schematic diagram of a display panel provided in a third embodiment of the present invention. As shown in FIG. 9, the present embodiment differs from the first and second embodiments in that: the first display region 1 and the second display region 2 are both bent longitudinally into a circular arc surface. In the present embodiment, a curvature of the first display region 1 is preferably not less than a curvature of the second display region 2. This is because, the first display region 1 is used for displaying a base portion of an image to be displayed, which has higher requirements on amplitude of a concave, whereas the second display region 2 is used for displaying a vertical portion of an image to be displayed, which has lower requirements on the amplitude of a concave. Thus, such arrangement enables the display panel to reflect a real position relationship between the base portion and the vertical portion of an image to be displayed and obtain a better sense of presence.

Similar to the first embodiment, preferably, an axis angle corresponding to the first display region 1 is also less than or equal to 90 degrees in the present embodiment, for example, the axis angle corresponding to the first display region 1 may be 45 degrees, because if the axis angle corresponding to the circular arc surface is greater than 90 degrees, the circular arc surface will bend upwardly, and therefore influences the viewing effect.

Certainly, in the present embodiment, a curvature of the first display region 1 may be equal to a curvature of the second display region 2. In such case, an axis angle corresponding to the entire display surface S may be greater than or equal to 15 degrees and less than or equal to 100 degrees, e.g., 45 degrees. Moreover, the axis angle corresponding to the display surface S may be less than or equal to 90 degrees to prevent the viewing effect from being effected due to the upwardly bent display surface. Furthermore, the preparation process of the display panel in such case is simpler.

Figure 10:
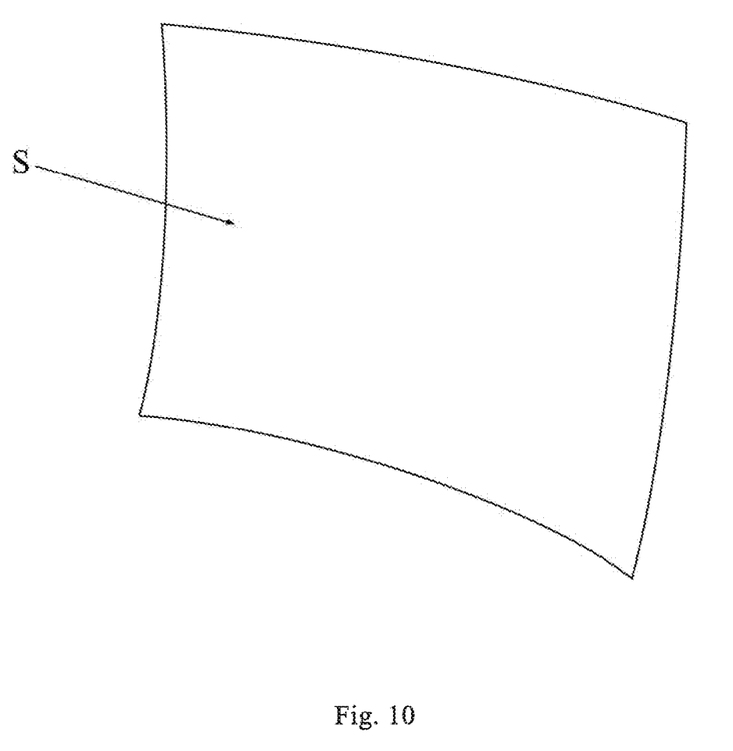
FIG. 10 is a schematic diagram of a display panel which is concave both longitudinally and laterally.

In the abovementioned embodiments, the display surface S is longitudinally concave only, but the present invention is not limited thereto. In practical use, as shown in FIG. 10, the display surface S may be laterally concave at the same time. When specific scenes such as corridor, tunnel and the like which include laterally extending scenes are displayed, close-up shots and long shots in a laterally extending scene are displayed nearby and far away respectively to provide the viewer with a better sense of presence.

In summary, in the display panel provided in the embodiments of the present invention, the display surface S thereof is concave, and when displaying images, the distances between different positions in an image and the viewer are different, which therefore improves the sense of presence of the viewer.

The present invention further provides an embodiment of a display device, in which the display device includes the display panel provided in the above embodiments of the present invention.

The display device provided in the embodiment of the present invention adopts the display panel provided in the above embodiments of the present invention and is capable of providing a better sense of presence when displaying images.

It should be understood that the above embodiments are merely exemplary embodiments adopted for describing the principle of the present invention, but the present invention is not limited thereto. Various modifications and improvements may be made by those skilled in the art without departing from the spirit and essence of the present invention, and these modifications and improvements also fall into the protection scope of the present invention.

The invention claimed is:

1. A display panel, comprising a display surface for displaying images, wherein the display surface is longitudinally concave when being viewed in front of the display surface, and the display surface comprises a first display region and a second display region which are connected longitudinally, the first display region is located below the second display region, the display panel is configured to identify a base portion and a vertical portion of an image to be displayed by the display panel, the first display region displays the base portion of the image, and the second display region displays the vertical portion of the image.

2. The display panel according to claim 1, wherein, the display surface is bent longitudinally into a circular arc surface.

3. The display panel according to claim 2, wherein, an axis angle corresponding to the circular arc surface is greater than or equal to 15 degrees and less than or equal to 100 degrees.

4. The display panel according to claim 3, wherein, the axis angle corresponding to the circular arc surface is less than or equal to 90 degrees.

5. The display panel according to claim 4, wherein, the axis angle corresponding to the circular arc surface is 45 degrees.

6. The display panel according to claim 1, wherein, the first display region and the second display region are both flat display regions, during normal use, the second display region is placed vertically, a certain intersection angle is formed between the first display region and the second display region, and the intersection angle between the first display region and the second display region is greater than or equal to 90 degrees and less than or equal to 165 degrees.

7. The display panel according to claim 6, wherein, the intersection angle between the first display region and the second display region is 125 degrees.

8. The display panel according to claim 1, wherein, the first display region is bent longitudinally into a circular arc surface.

9. The display panel according to claim 8, wherein, an axis angle corresponding to the circular arc surface of the first display region is less than or equal to 90 degrees.

10. The display panel according to claim 8, wherein, the second display region is bent longitudinally into a circular arc surface, and a curvature of the first display region is not less than a curvature of the second display region.

11. The display panel according to claim 1, wherein, the first display region comprises a plurality of flat display sub-regions which are connected longitudinally, and certain intersection angles are formed by the flat display sub-regions.

12. The display panel according to claim 11, wherein, the intersection angles between adjacent flat display sub-regions increase successively from top to bottom.

13. The display panel according to claim 1, wherein, the display surface is also laterally concave.

14. The display panel according to claim 1, wherein, an area of the first display region is not less than an area of the second display region.

15. The display panel according to claim 1, wherein, the display panel is further configured to cut the base portion of the image into an inverted isosceles trapezoid image and stretch the inverted isosceles trapezoid image into a rectangular image; and the first display region displays the rectangular image.

16. A display device, comprising the display panel according to claim 1.

* * * * *